Dec. 23, 1958   J. F. PAULSEN   2,865,586
ANTI-VIBRATION RESILIENT SUPPORTS
Filed Nov. 15, 1954   2 Sheets-Sheet 1

INVENTOR
JEAN FELIX PAULSEN,
BY
Robert B. Pierson
ATTORNEY

Dec. 23, 1958   J. F. PAULSEN   2,865,586
ANTI-VIBRATION RESILIENT SUPPORTS
Filed Nov. 15, 1954   2 Sheets-Sheet 2
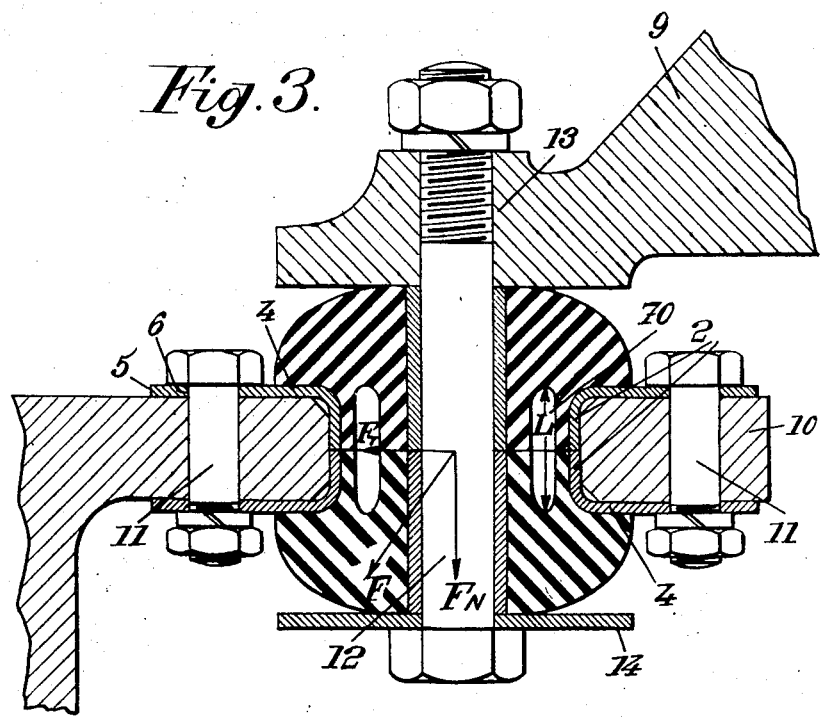
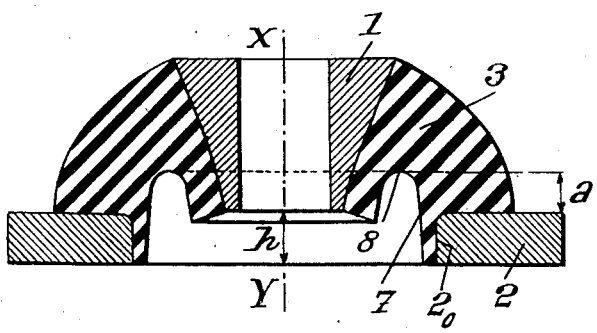
INVENTOR
JEAN FELIX PAULSEN,
BY
Robert B Pearson
ATTORNEY

United States Patent Office 2,865,586
Patented Dec. 23, 1958

2,865,586

ANTI-VIBRATION RESILIENT SUPPORTS

Jean Félix Paulsen, Paris, France, assignor to the company "Luxembourgeoise de Brevets et de Participations," Luxemburg, a society of the Grand Duchy of Luxemburg Application November 15, 1954, Serial No. 468,929

2 Claims. (Cl. 248—10)

The present invention relates to anti-vibration resilient supports including two coaxial rigid annular parts overlapping each other in the axial direction, that is to say one of which surrounds the other over at least a portion of its length, said two parts being connected together by a mass of a resilient material adhering both to the inner wall of the larger part and to the outer wall of the smaller one, said mass, made in particular of rubber, having advantageously the shape of a mushroom the base of which is applied upon an annular flange carried by the outer rigid part.

The object of the present invention is to provide a support of this kind which is better adapted to meet the requirements of practice than those used up to the present time and in particular which is resilient not only in the direction of the common axis of the two rigid parts but also in directions transverse to said axis.

According to my invention, the portion of the resilient mass located directly between said two parts, that is to say located between the portions of said rigid parts that surround each other, is provided with at least one recess whereby resilient displacements of said parts with respect to each other are possible in directions transverse to said axis.

Preferred embodiments of the present invention will be hereinafter described with reference to the accompanying drawings given merely by way of example and in which:

Fig. 3 is an axial sectional view of a support of the same kind, in particular for an engine suspension, the elements of this support being subjected to an axial pre-stressing.

Fig. 4 is a sectional view of a support of the same kind as in Fig. 1 but made according to a modification.

It will first be reminded that supports of the kind above referred to, such as they were made up to the present time, were capable only of supporting and damping stresses applied in the direction of the axis common to both of the rigid parts of the support. As a rule, such supports were constituted by two cylindrical rigid parts partly engaged in each other and connected together by a resilient mass in the form of a mushroom, this mass adhering both to the outer cylindrical surface of the inner rigid part and to the inner cylindrical surface of the outer rigid part and also to a flange integral with said outer part, the base of the mushroom being applied upon this flange.

When such a support is subjected to a load in the direction tending to crush the resilient mass toward the flange, a quick increase of the resilient reaction is obtained. Thus a variable rigidity is achieved, which is advantageous in the case of particularly high loads.

But such supports cannot be used in many cases, as occur frequently in practice, where, outside of the stresses exerted in the direction of the axis, there are also stresses in various other directions, that is to say in directions having components perpendicular to said axis. In the case where such transverse stresses exist, the resilient material located between the two rigid parts is not capable of deforming freely because it can only be compressed and has not the desired resiliency to compression.

In order to obviate these drawbacks, according to my invention there is provided in the resilient mass, in the portion thereof located directly between the two rigid parts, at least one recess which enables said mass to have resilient deformations in directions transverse to the above mentioned axis.

The transverse deformations will of course depend upon the characteristics of the recess provided in the resilient mass, that is to say its position, its shape, its width, etc.

Figure 1:
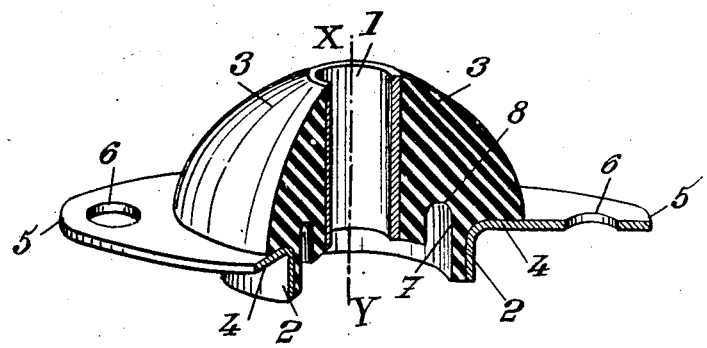
Fig. 1 is a perspective view with parts cut away of a resilient anti-vibration support made according to my invention, the elements being shown in the relative position they occupy when no stress is being applied to the support.
Figure 2:
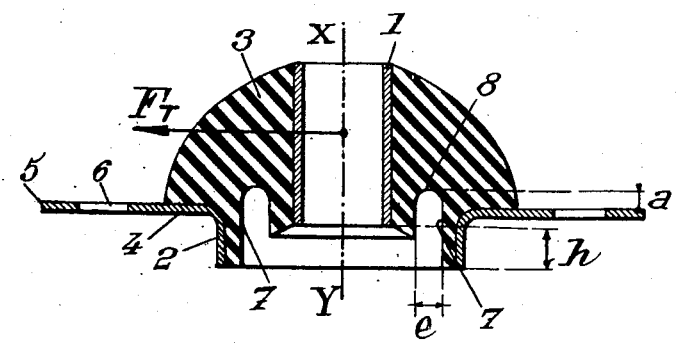
Fig. 2 is an axial section of the support of Fig. 1.

In the embodiment of the present invention illustrated by Figs. 1 and 2, the resilient support is essentially constituted by two rigid parts 1 and 2, for instance of cylindrical shape and of different diameters, adapted to remain at rest coaxial to each other along axis XY. These rigid parts are connected together by a resilient mass 3 adhering in any suitable manner to the external and internal surfaces of the rigid parts, such a mass being advantageously as shown by the drawing, in the form of a mushroom the base of which is resting upon a flange 4 rigid with rigid part 2. Said flange 4 may be provided with lugs 5 with fixation holes 6. The resilient mushroom shaped mass has dome and stem shaped portions with the base of the dome and the stem thereof engaging rigid part 2.

According to the present invention, the mass of resilient material 3 is provided, in the portion thereof located between the respective ends of rigid parts 1 and 2, with a recess, for instance an annular recess 7, which opens to the outside.

The dimensions of this recess are chosen suitably in accordance with the desired transverse resiliency. Since it is supposed that rigid part 1 is engaged in rigid part 2, the thickness $e$ of recess 7 is of course smaller than the difference between the radii of parts 1 and 2. Advantageously, the depth of this groove 7 will be such that its bottom 8 is at least at the level of the top surface of flange 4 or even slightly above it at a distance $a$ (Fig. 2).

Generally in the relative position occupied by the elements, where no stress is being applied to the device (Fig. 2), the inner rigid part 1 is but very slightly engaged inside the outer rigid part 2. If $h$ is the distance in the axial direction between the free edges of the two rigid parts 1 and 2, $a$ is preferably equal to $$\frac{h}{2}$$

In a general way, the invention applies whatever be the value of $h$. It should be considered that in the case illustrated by Fig. 2, $h$ is positive. On the contrary, $h$ will be considered as negative when the inner rigid part 1 extends throughout the outer rigid part 2 and projects downwardly from the edge thereof.

Of course, with such an arrangement the desired resiliency is obtained in the axial direction XY. But in addition to this, the provision of groove 7 enables the support 1, under the effect of a transverse effort $F_T$, to have, with respect to rigid part 2 supposed to be fixed, a relatively free transverse displacement as long as the sides of groove 7 do not come into contact with each other. When said sides are brought into contact, the displacements become very small and the resilient mass offers a high resistance to such displacements.

I may of course combine with each other two supports as shown by Figs. 1 and 2 disposed in opposed directions. Such an arrangement is shown by Fig. 3. In the case of Fig. 3, the coaxial rigid parts have been given, previous to the assembly of the two supports, a relative displacement such that the resilient masses are pre-stressed in the axial direction.

Thus the edges of the inner and outer rigid parts are in the same plane at right angles to the axis of the device.

In the arrangement illustrated by Fig. 3, the system is interposed between an engine 9 and its supporting frame 10. The system is fixed to frame 10 by means of bolts 11 and to the engine through a bolt 12 cooperating on one side with a lug 13 rigid with the engine and on the other side with an abutment plate 14.

In this arrangement, the pre-stressing corresponds to a deformation of a value equal to $h$ for each of the two halves thereof. On the other hand, when the elements are assembled together, a closed annular recess 70 of a height equal to L is obtained.

This suspension has for axial stresses in the direction XY, corresponding to the component $F_N$ of the efforts applied to the support, a high initial resiliency which gradually decreases as the system is being deformed. For transverse stresses (component $F_T$), there is a high freedom of resilient deformation for movements of an amplitude lower than the thickness $e$ of annular recess 70, after which the system becomes much stiffer.

In the above description, it has been supposed that rigid parts 1 and 2 had cylindrical surfaces, but of course they may have surfaces of other shapes. For instance, as shown by Fig. 4, one of the active surfaces of rigid part 1 has a conical shape which may be slightly curved, whereas the other rigid part 2 consists of a thick plate provided with a hole $2_0$ of cylindrical or conical shape.

The anti-vibration support according to the invention has many advantages. In particular, it is capable of absorbing vibrations in all directions with a variable resiliency. Furthermore it is particularly strong.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An anti-vibration elastic support device which comprises, in combination, a rigid part in the form of a body of revolution, a rigid annular part in the form of a body of revolution coaxial with the first mentioned one and including a flat end wall transverse to the common axis of said parts and located close to one end of said first mentioned part and a tubular inner wall, of a diameter greater than that of said end of said first mentioned part, extending axially from the inner periphery of said flat end wall in a direction opposed to that in which said first mentioned part is extending from said end thereof, and an annular mass of a resilient material the outer surface of which has the general shape of a dome with a stem portion, the inner wall of said annular mass adhering to the outer wall of said first mentioned part and the base of the dome and stem of said resilient mass adhering respectively to said end flat wall and said tubular inner wall of said second mentioned part, said resilient mass being provided with an annular groove having substantially cylindrical walls coaxial with said rigid parts, said groove surrounding said first mentioned part and extending from said end thereof to a substantial distance so that any plane at right angles to the axis of said parts and intersecting both of said parts also intersects said groove, to permit resilient displacements of said parts with respect to each other in directions transverse to said axis.

2. An elastic supporting system including two devices according to claim 1 mounted coaxially in opposition, with the ends of said rigid parts on the sides of the stems of the resilient masses applied against each other, and means for holding said resilient masses prestressed around the annular groove existing therein.

References Cited in the file of this patent

UNITED STATES PATENTS

| | | |
|---|---|---|
| 2,079,798 | Geyer | May 11, 1937 |
| 2,460,586 | Keetch | Feb. 1, 1949 |

FOREIGN PATENTS

| | | |
|---|---|---|
| 801,707 | France | May 23, 1936 |
| 524,203 | Great Britain | Aug. 1, 1940 |
| 697,449 | Great Britain | Sept. 23, 1953 |

UNITED STATES PATENT OFFICE

CERTIFICATE OF CORRECTION

Patent No. 2,865,586 December 23, 1958

Jean Félix Paulsen

It is hereby certified that error appears in the above numbered patent requiring correction and that the said Letters Patent should read as corrected below.

In the heading to the printed specification, between lines 7 and 8, insert -- Claims priority, application France November 21, 1953 --.

Signed and sealed this 25th day of August 1959.

(SEAL)
Attest:

KARL H. AXLINE
Attesting Officer

ROBERT C. WATSON
Commissioner of Patents